(12) United States Patent
Gupta et al.

(10) Patent No.: US 9,420,044 B2
(45) Date of Patent: Aug. 16, 2016

(54) LEVERAGING SYSTEM SIGNALING SERVICE ADVERTISEMENTS FOR APPLICATION-LAYER DISCOVERY AND CONNECTION MANAGEMENT IN AN INTERNET OF THINGS (IOT) ENVIRONMENT

(71) Applicant: Qualcomm Innovation Center, Inc., San Diego, CA (US)

(72) Inventors: Binita Gupta, San Diego, CA (US); Gregory Burns, Seattle, WA (US); Jack H. Profit, Vashon, WA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 148 days.

(21) Appl. No.: 14/316,254

(22) Filed: Jun. 26, 2014

(65) Prior Publication Data

US 2015/0006719 A1    Jan. 1, 2015

Related U.S. Application Data

(60) Provisional application No. 61/839,801, filed on Jun. 26, 2013.

(51) Int. Cl.
*H04L 29/08* (2006.01)
*H04W 40/24* (2009.01)

(52) U.S. Cl.
CPC ............... *H04L 67/12* (2013.01); *H04L 67/16* (2013.01); *H04W 40/246* (2013.01)

(58) Field of Classification Search
CPC .................................................. H04W 40/246
See application file for complete search history.

(56) References Cited

U.S. PATENT DOCUMENTS

| 8,327,178 | B2 * | 12/2012 | Vandwalle | H04W 8/005 709/223 |
|---|---|---|---|---|
| 9,131,266 | B2 * | 9/2015 | Guedalia | H04N 21/43615 |
| 2009/0210532 | A1 * | 8/2009 | Lim | H04L 12/2805 709/226 |
| 2010/0202450 | A1 * | 8/2010 | Ansari | G06Q 30/04 370/389 |
| 2014/0207566 | A1 * | 7/2014 | Kamran | H04L 67/1095 705/14.45 |
| 2014/0304081 | A1 * | 10/2014 | Jung | G06Q 30/0267 705/14.64 |
| 2015/0381776 | A1 * | 12/2015 | Seed | H04L 67/16 709/203 |

FOREIGN PATENT DOCUMENTS

| KR | WO 2014010784 A1 * | 1/2014 | ............ H04W 4/005 |
|---|---|---|---|
| WO | WO 2013123445 A1 * | 8/2013 | ............ H04W 4/005 |
| WO | WO 2014010784 A1 * | 1/2014 | ............ H04W 4/005 |

* cited by examiner

*Primary Examiner* — Uzma Alam
(74) *Attorney, Agent, or Firm* — Neugeboren O'Dowd PC

(57) ABSTRACT

Internet of Things (IoT) devices and methods of operating the same are disclosed. A method may include registering a set of services configured for execution on a producer IoT device with a producer management application, and broadcasting or multicasting a system service advertisement as a first system signal via a given system signal protocol to notify one or more consumer IoT devices that one or more services of the registered set of services are available via the producer IoT device. The producer IoT device receives, in response to the system service advertisement, at least one request for a service announcement from at least one of the consumer IoT devices, and the producer IoT device unicasts, in response to the request, the at least one service announcement that announces the set of services to the at least one consumer IoT device as a second system signal via the given system signal protocol.

16 Claims, 15 Drawing Sheets

US 9,420,044 B2

LEVERAGING SYSTEM SIGNALING SERVICE ADVERTISEMENTS FOR APPLICATION-LAYER DISCOVERY AND CONNECTION MANAGEMENT IN AN INTERNET OF THINGS (IOT) ENVIRONMENT

CLAIM OF PRIORITY UNDER 35 U.S.C. §119

The present Application for Patent claims priority to Provisional Application No. 61/839,801 entitled "LEVERAGING SYSTEM SERVICE ADVERTISEMENTS FOR APPLICATION-LAYER DISCOVERY AND CONNECTION MANAGEMENT IN AN INTERNET OF THINGS (IoT) ENVIRONMENT" filed Jun. 26, 2013, and assigned to the assignee hereof and hereby expressly incorporated by reference herein.

FIELD

Embodiments relate to leveraging system service advertisements for application-layer discovery and connection management in an Internet of Things (IoT) environment.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

In an IoT environment, advertising and discovery of application-layer services can be implemented using application-initiated multicast/broadcast advertisement messages. But this approach typically requires each application to independently generate an advertisement message for advertising its respective service in the IoT environment, and each advertisement message is broadcast to all connected devices in the IoT environment (e.g., via Bluetooth, WiFi, LTE, etc.). This can generate a high amount of multicast traffic in the IoT environment, and in addition, because multicast and broadcast protocols typically do not require feedback (e.g., ACKs or NACKs), each of the service advertisements have relatively low reliability, and for this reason, are retransmitted at a relatively high frequency, which creates more traffic. As such, a need exists for improved advertising and discovery of application-layer services.

SUMMARY

A first aspect includes a method of operating Internet of Things (IoT) devices deployed in a local IoT environment. The method may include registering, at a producer IoT device, a set of services configured for execution on the producer IoT device with a producer management application on the producer IoT device. The producer IoT device broadcasts or multicasts, from the producer IoT device, a system signaling service advertisement as a first system signal via a given system signal protocol to notify one or more consumer IoT devices in the local IoT environment that one or more services of the registered set of services are available via the producer IoT device. The given system signal protocol may be configured such that new system signals of a same type as any previously received system signals function to replace the previously received system signals. The producer IoT device receives, in response to the system signaling service advertisement, at least one request for a service announcement from at least one of the one or more consumer IoT devices, and the producer IoT device unicasts, in response to the at least one request, the service announcement that announces the set of services to the at least one consumer IoT device as a second system signal via the given system signal protocol.

A second aspect may be characterized as an Internet of Things (IoT) device that includes transceiver to communicate with other IoT devices over a network, and the IoT device includes a peer-to-peer platform to provide a peer-to-peer connection between the IoT device and the other IoT devices in a local IoT environment. A management application on the IoT device is configured to register a set of services that are configured for execution on the IoT device, and the management application broadcasts or multicasts, from the IoT device, a system signaling service advertisement as a first system signal via a given system signal protocol to notify one or more consumer IoT devices in the local IoT environment that one or more services of the registered set of services are available. The given system signal protocol is configured such that new system signals of a same type as any previously received system signals function to replace the previously received system signals. The management application is also configured to receive, at the IoT device, in response to the system signaling service advertisement, at least one request for a service announcement from at least one of the consumer IoT devices, and the management application unicasts, from the producer IoT device, in response to the at least one request, the service announcement that announces the set of services to the at least one consumer IoT device as a second system signals via the given system signal protocol.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an Internet of Things (IoT) device in accordance with aspects of the disclosure, while

DETAILED DESCRIPTION

Figure 1A:
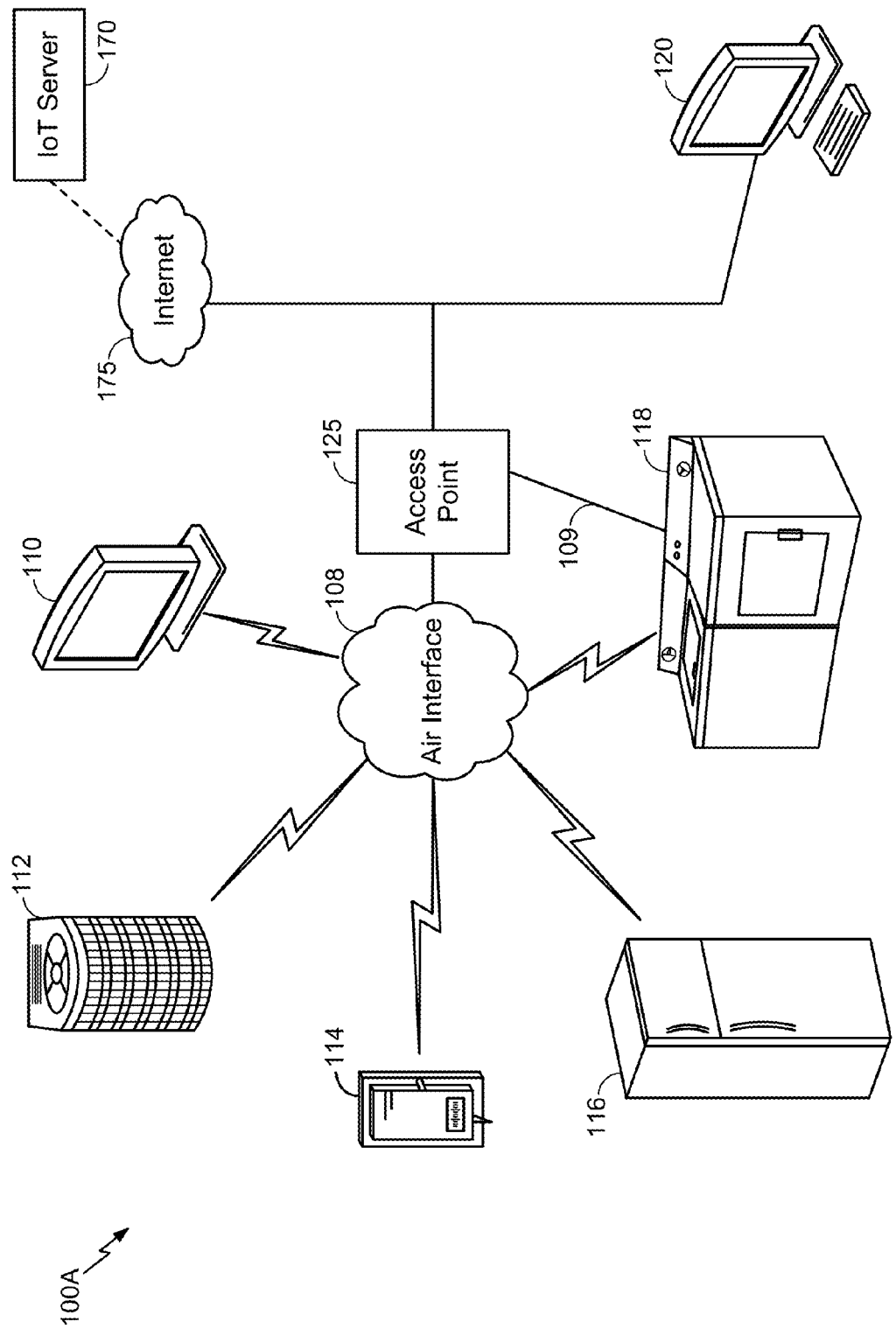
FIG. 1A illustrates a high-level system architecture of a wireless communications system in accordance with an aspect of the disclosure.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the wired connection 109. Alternatively, or additionally, some or all of IoT devices 110-120 may be configured with a communication interface independent of air interface 108 and wired connection 109. For example, if the air interface 108 corresponds to a Wi-Fi interface, certain of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
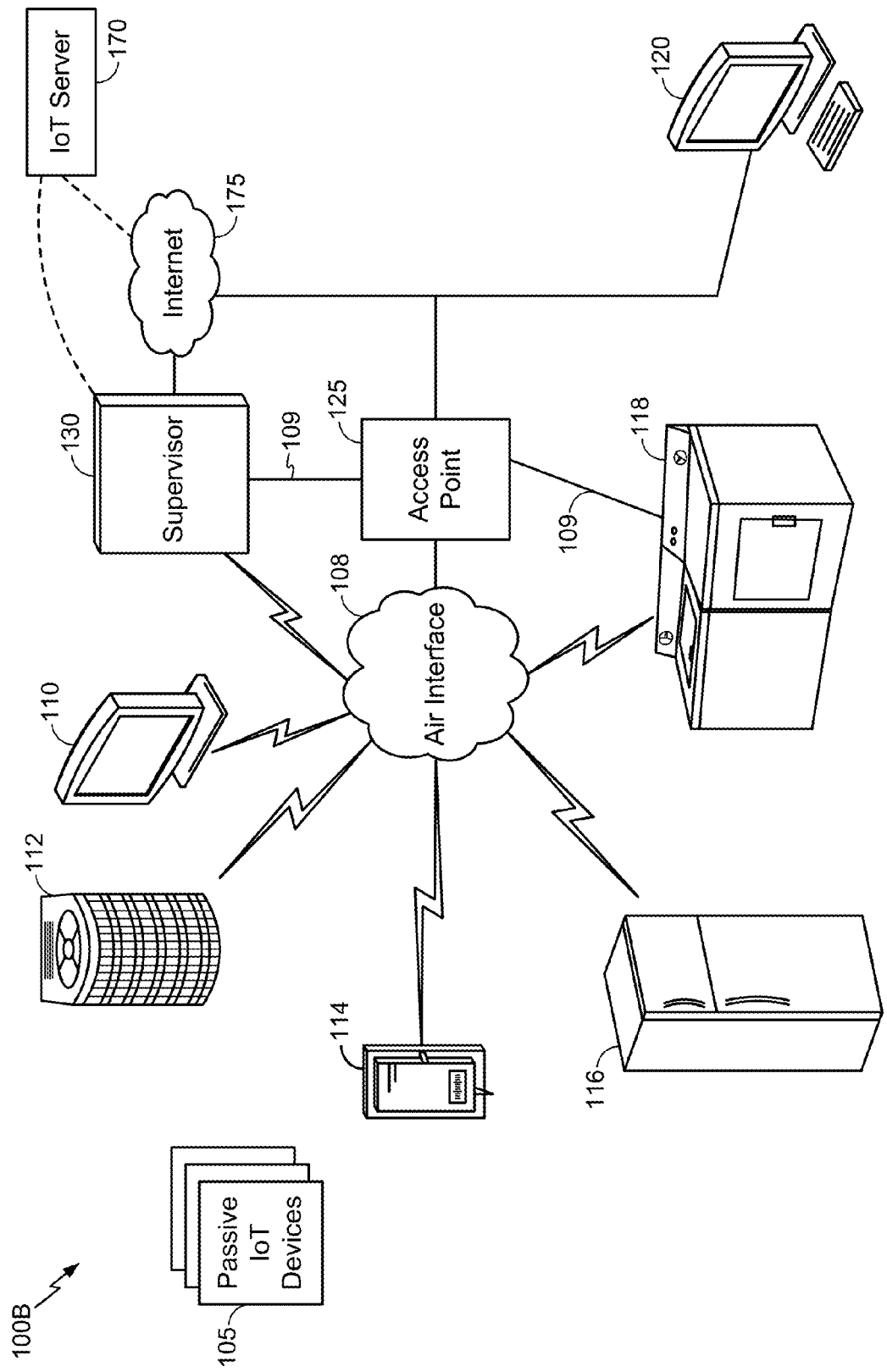
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In an embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
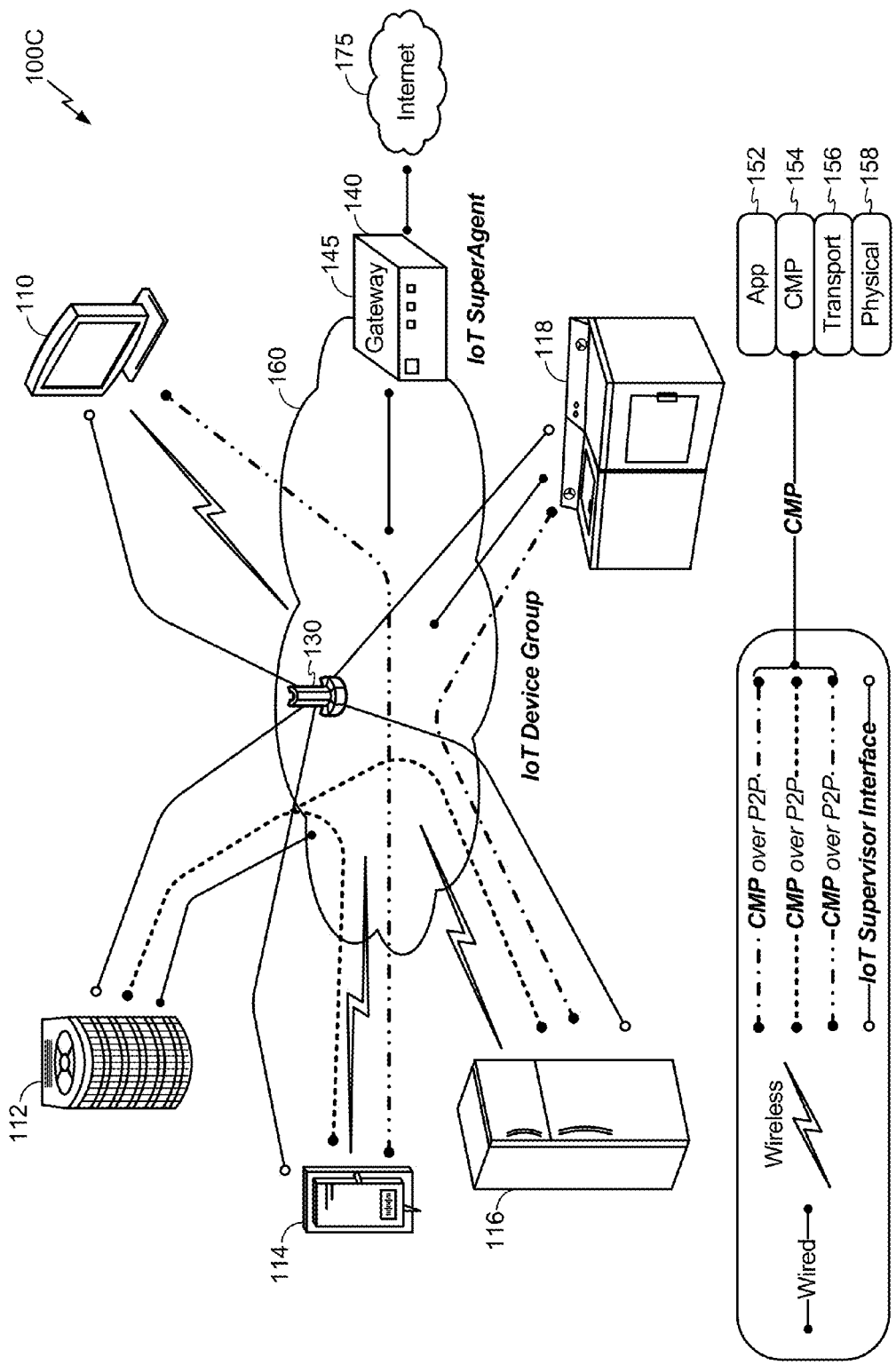
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
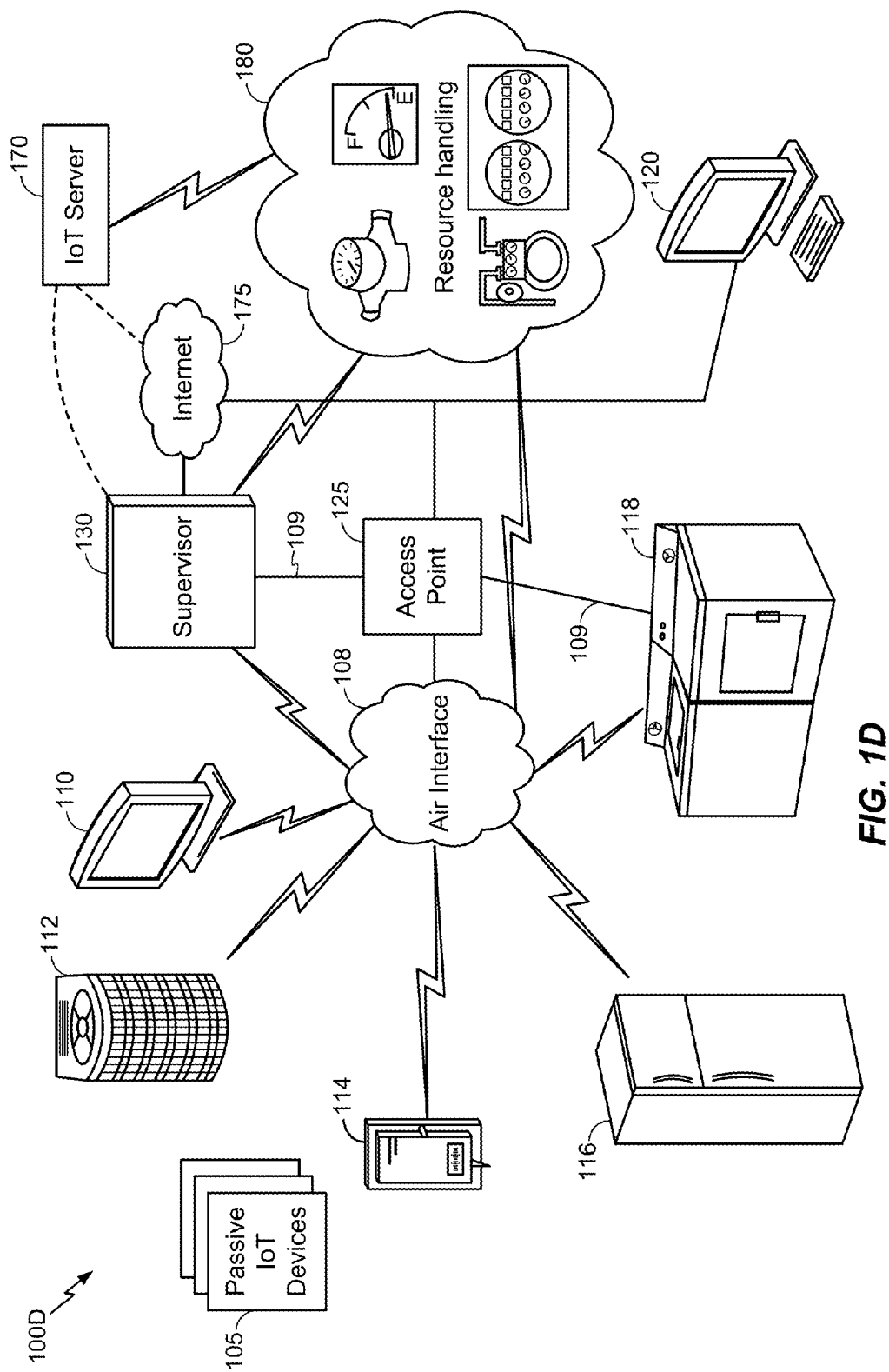
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIG. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
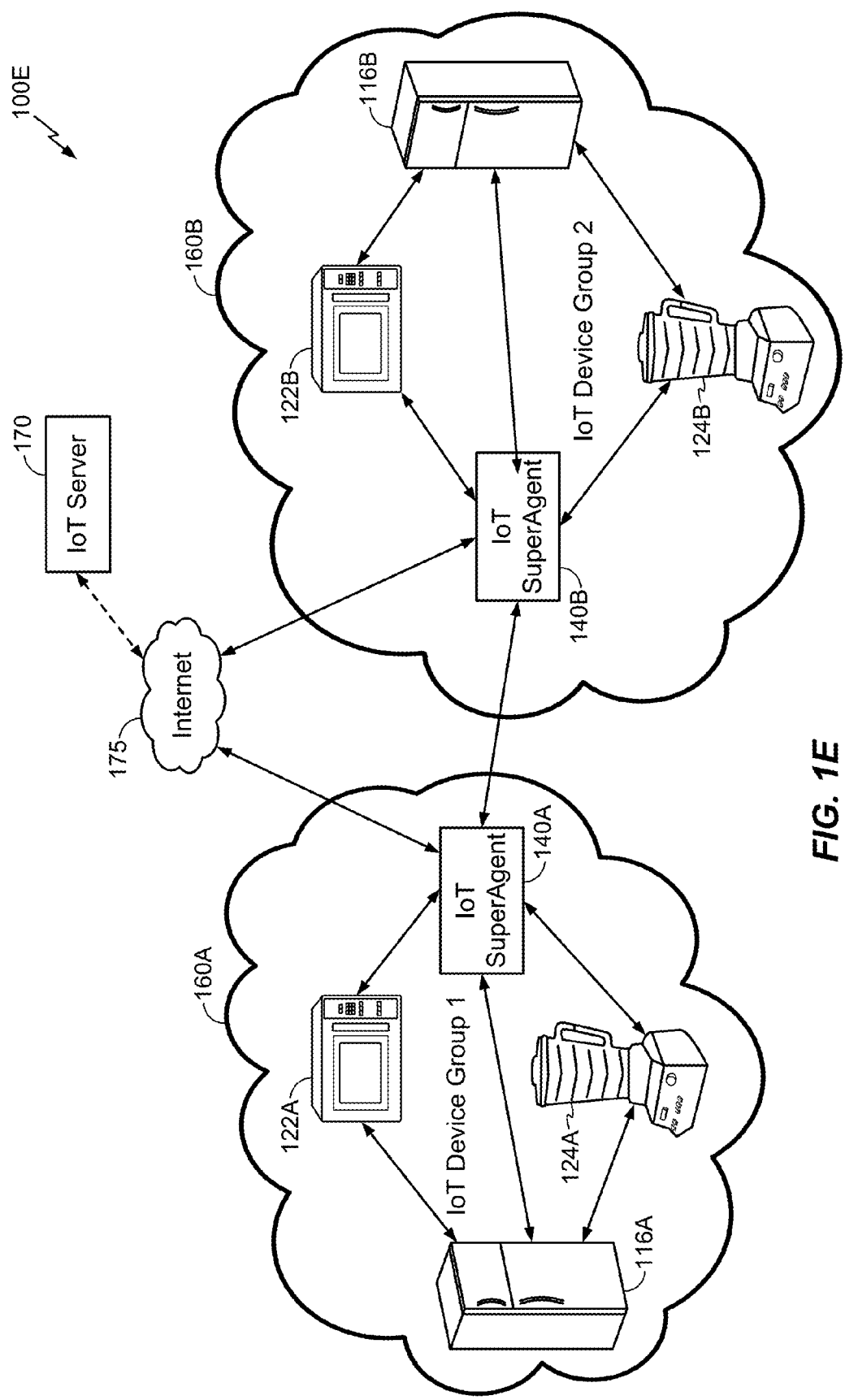
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIG. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 160A and 160B, those skilled in the art will appreciate that any number of IoT device groups may suitably communicate with each other using IoT SuperAgents.

Figure 2A:
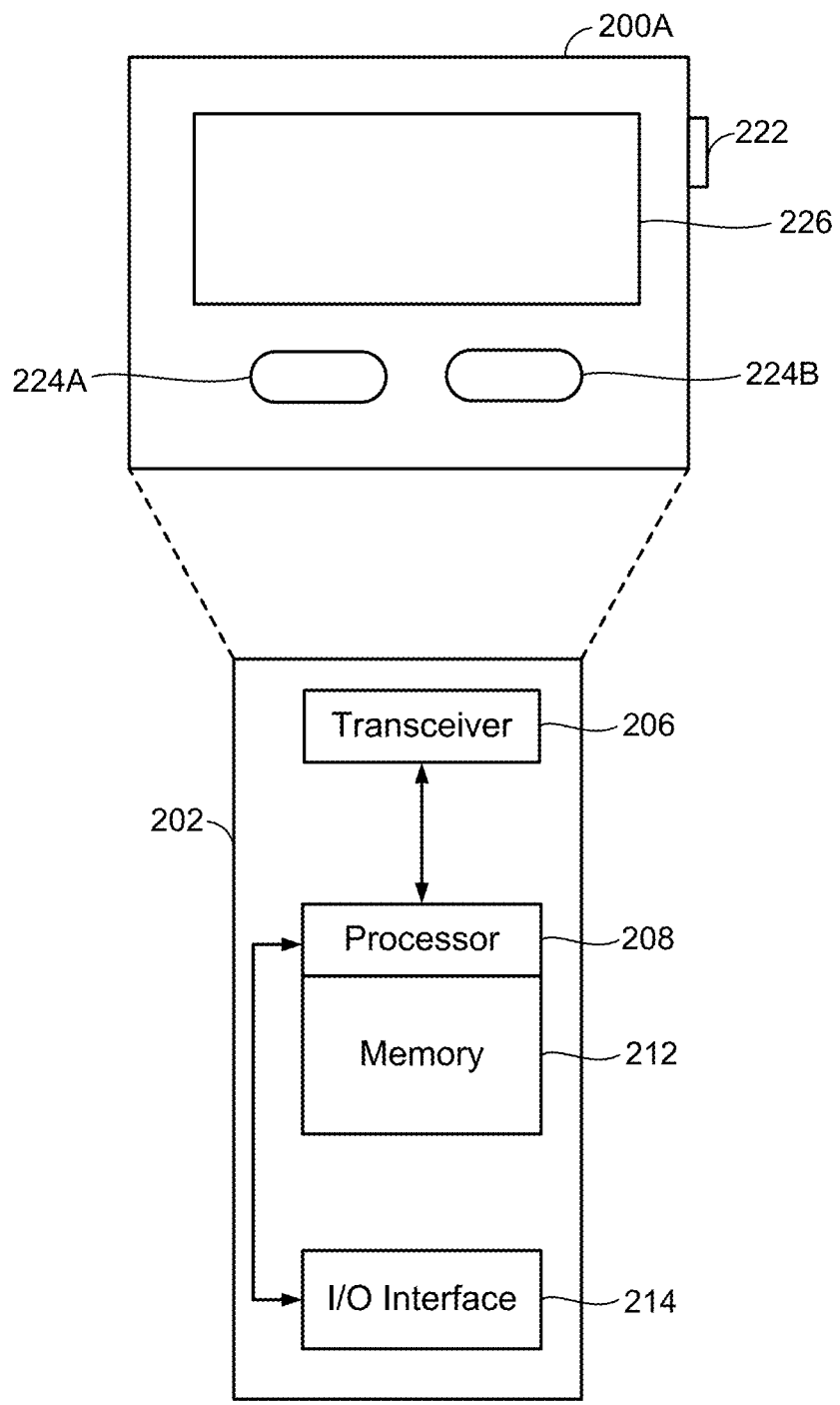

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
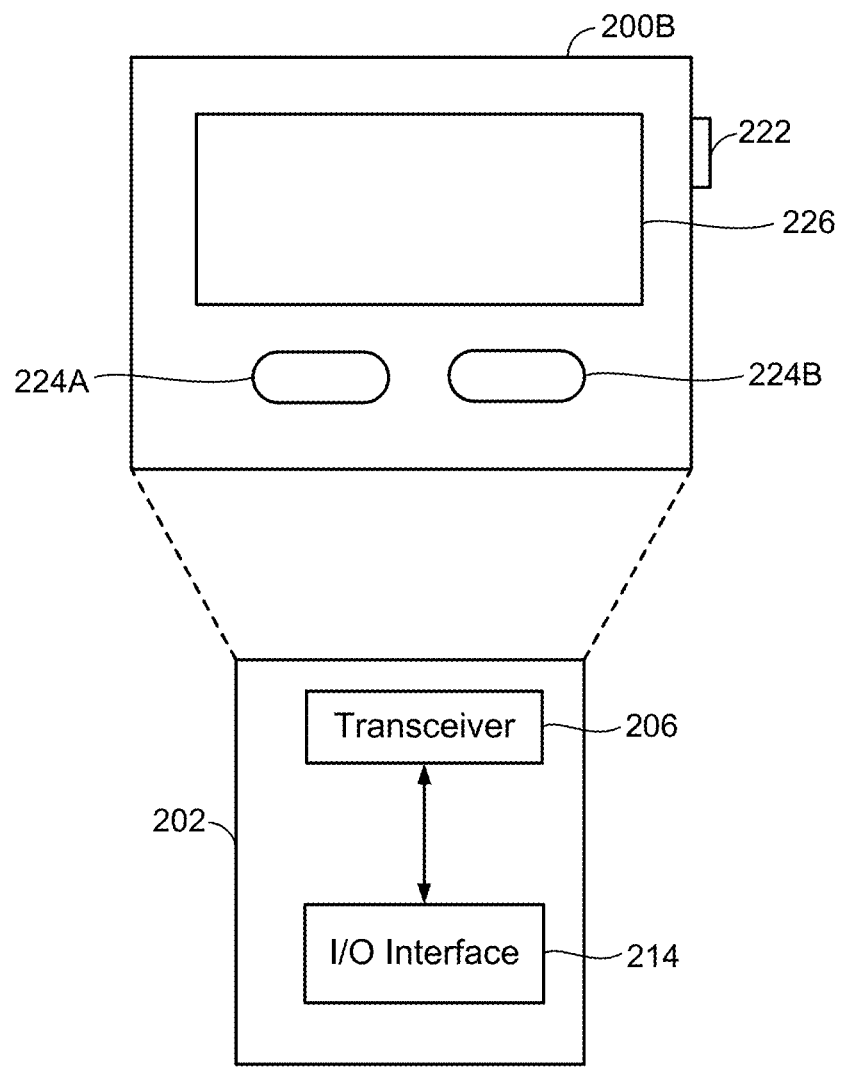
FIG. 2B illustrates a passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in an embodiment, the passive IoT device 200A may only include an I/O interface 214 or other suitable mechanism that allows the passive IoT device 200B to be observed, monitored, controlled, managed, or otherwise known within a controlled IoT network. For example, in an embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
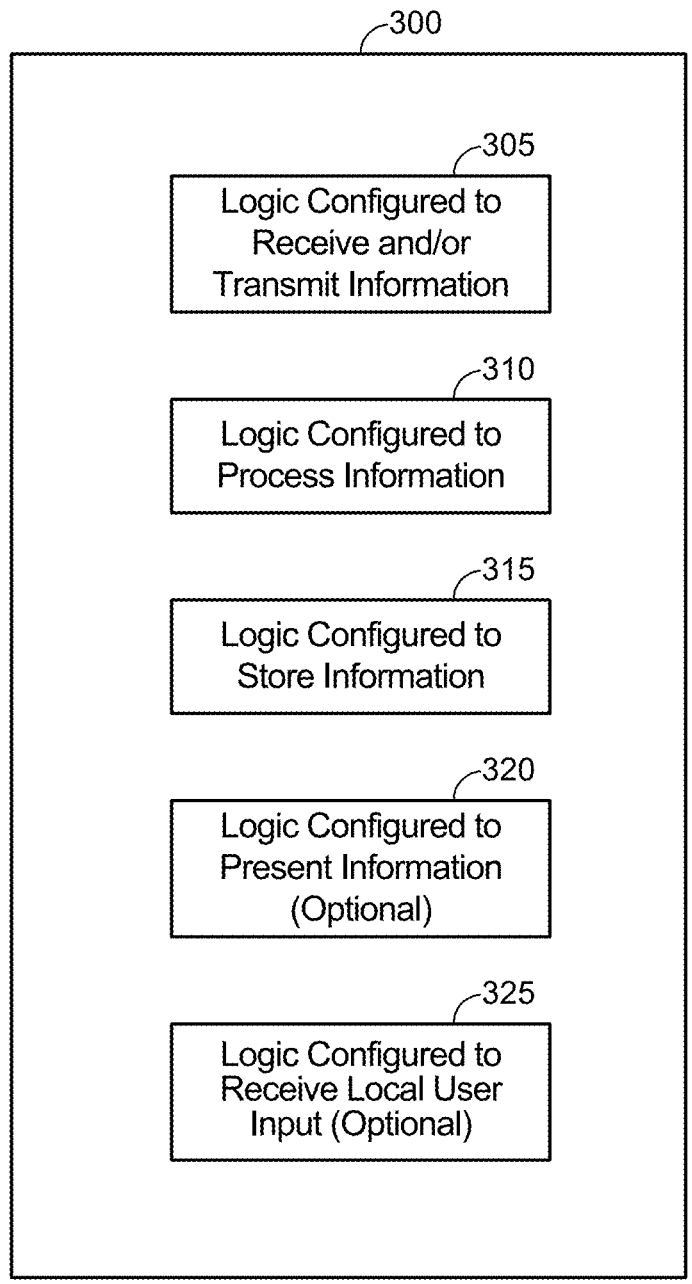
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
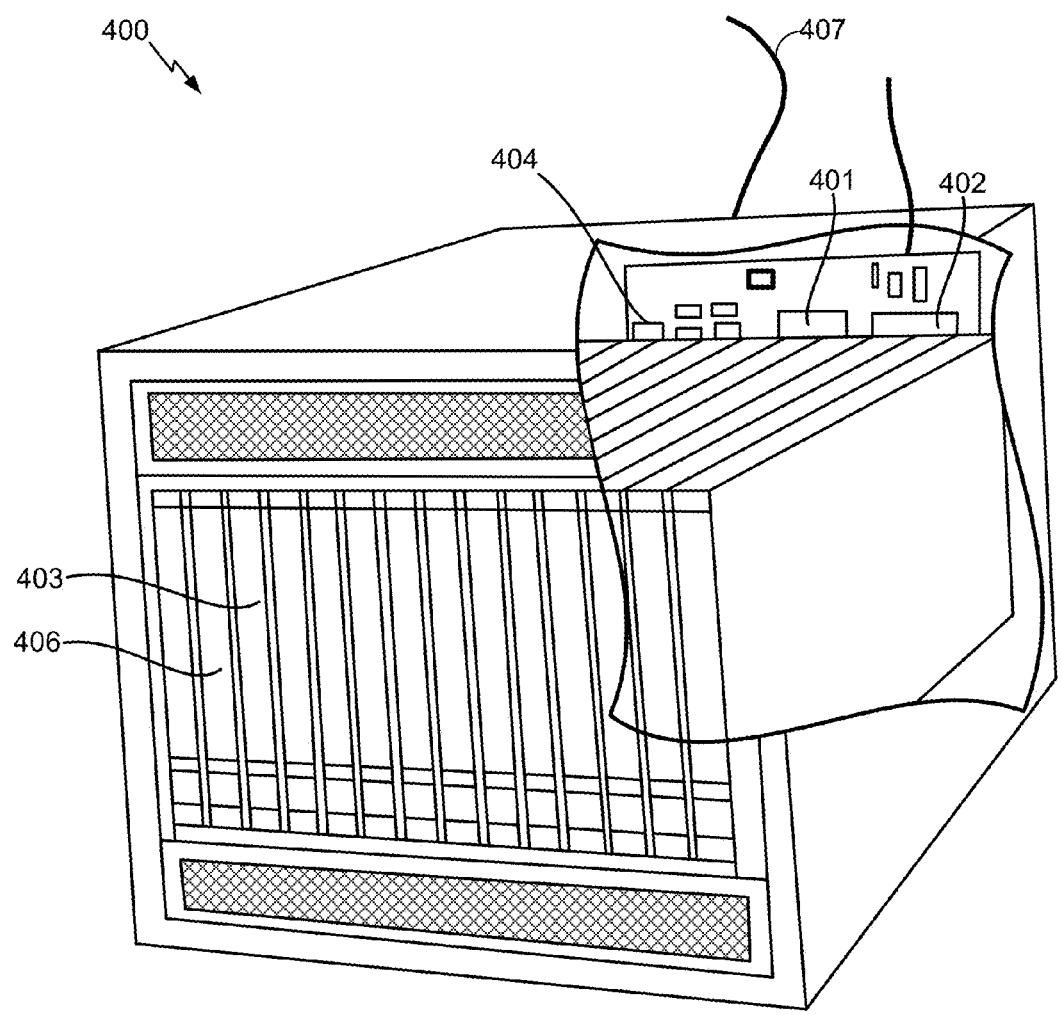
FIG. 4 illustrates a server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
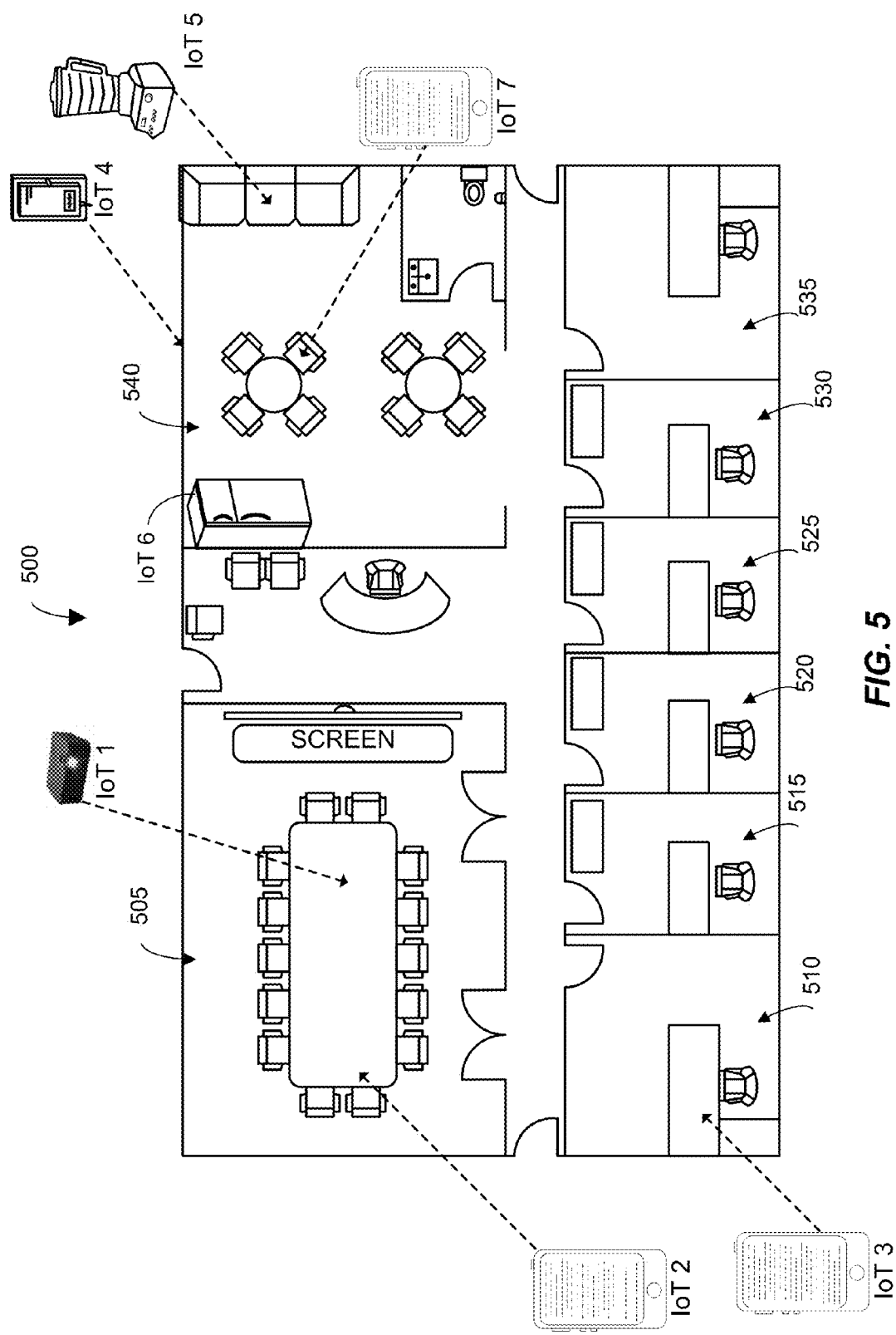
FIG. 5 illustrates an example of an Internet of Things (IoT) environment in accordance with an embodiment of the invention.

FIG. 5 illustrates an example of an IoT environment 500 in accordance with an embodiment of the invention. In FIG. 5, the IoT environment 500 is an office space with a conference room 505, a plurality of offices 510 through 535 and a kitchen 540. Within the office space, IoT device 1 (e.g., a video projector) and IoT device 2 (e.g., a handset device such as a cell phone or tablet computer) are positioned the conference room 505, and IoT device 3 (e.g., a handset device such as a cell phone or tablet computer) is positioned in office 510. Also, IoT device 4 (e.g., a thermostat), IoT device 5 (e.g., a blender), IoT device 6 (e.g., a refrigerator) and IoT device 7 (e.g., a handset device such as a cell phone or tablet computer being operated by an employee on his/her lunch break) are positioned in the kitchen 540. As will be appreciated, while the IoT environment 500 of FIG. 5 is directed to an office, many other configurations of IoT environments are also possible (e.g., residential homes, retail stores, vehicles, stadiums, etc.).

IoT devices are characterized herein as corresponding to either "producer" IoT devices (e.g., IoT devices that produce data for dissemination to other IoT devices) or "consumer" IoT devices (e.g., IoT devices that receive data from a producer IoT device). Examples of producer IoT devices include toasters, ovens, washers, dryers, microwaves, etc., and examples of consumer IoT devices include smart phones, tablet computers, televisions, etc. Certain IoT devices can be producer IoT devices in some contexts and consumer IoT devices in other contacts. For example, a television may be a consumer IoT device when the television receives a notification for presentation thereon (e.g., while watching TV, the TV briefly flashes a "washer has completed wash cycle" notification), and the television may be a producer IoT device when the television has a notification to report to other IoT devices (e.g., that a particular television program has completed its recording, a score update for a television program being viewed, etc.). Consumer IoT devices are configured with a widget that interprets the data received from producer IoT devices for output via a control panel in a display of the consumer IoT devices. The control panel interface can permit a user of the consumer IoT devices to perform certain actions, such as dismissing a notification from view (e.g., a "washer has completed wash cycle" notification can appear in the control panel which is dismissed or canceled by the user), or implementing a control function on a remote producer IoT device (e.g., a "washer has completed wash cycle" notification can appear in the control panel which causes the user to request the washer to transition to a low-heat tumble mode to reduce wrinkles).

Figure 6:
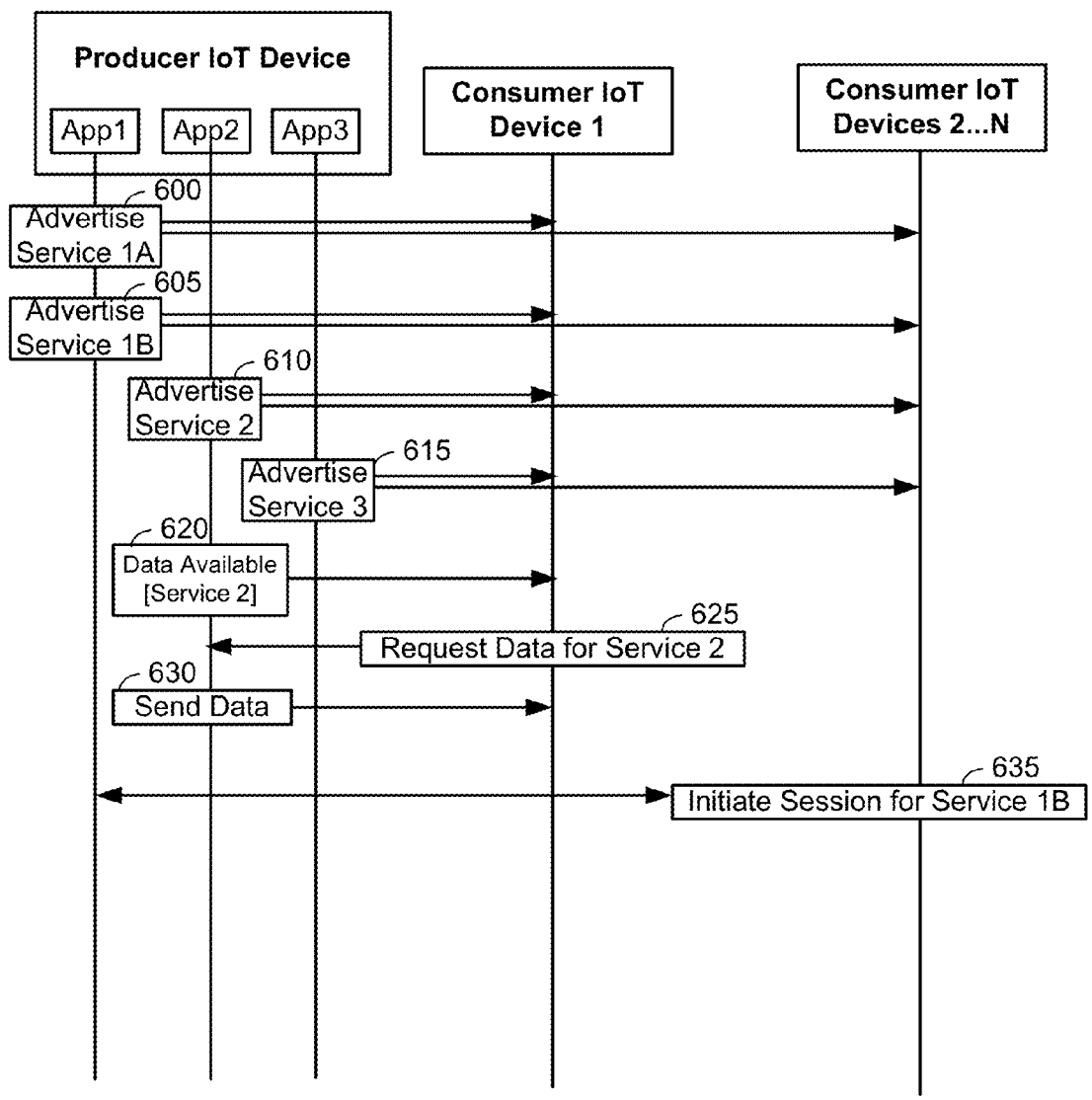
FIG. 6 illustrates a conventional process for advertising services in an IoT environment such as the IoT environment of FIG. 5.

In an IoT environment, advertising and discovery of application-layer services can be implemented using application-initiated multicast/broadcast advertisement messages, as shown in FIG. 6. FIG. 6 illustrates a conventional process for advertising services in an IoT environment such as the IoT environment 500 of FIG. 5.

Referring to FIG. 6, assume that a producer IoT device is provisioned with Apps 1, 2 and 3, with App1 supporting services 1A and 1B, application 2 supporting service 2 and application 3 supporting service 3. App1 generates and transmits a multicast or broadcast message throughout a local IoT environment (e.g., via Bluetooth, WiFi, LTE, etc.) including consumer IoT devices 1 . . . N that advertises service 1A, 600, and App1 also generates and transmits a multicast or broadcast message throughout the local IoT environment that advertises service 1B, 605. Similarly, App2 generates and transmits a multicast or broadcast message throughout the local IoT environment that advertises service 2, 610, and App3 generates and transmits a multicast or broadcast message throughout the local IoT environment that advertises service 3, 615. The advertisement messages of 600 through 615 each include information such as a service number or ID, connection information for responding to the service advertisements, and so on.

Later, assume App2 has data available for transmission (e.g., a notification that a washer is done with a wash cycle, a notification that a microwave or oven timer has expired, that a water heater is leaking, etc.). Accordingly, App2 generates and transmits a multicast or broadcast message throughout the local IoT environment that indicates data is available for service 2, 620. Consumer IoT device 1 is interested in service 2 and requests the data from App2, 625, and App2 transmits the data via unicast to consumer IoT device 1, 630. Later, one or more of consumer IoT devices 2 . . . N use connection data contained in the advertisement for service 1B from 605 to initiate a session for service 1B with App1 on the producer IoT device, 635.

As will be appreciated, the approach described in FIG. 6 requires each application to independently generate an advertisement message for advertising its respective service in the IoT environment, and each advertisement message is broadcast to all connected devices in the IoT environment (e.g., via Bluetooth, WiFi, LTE, etc.). This can generate a high amount of multicast traffic in the IoT environment. Also, because multicast and broadcast protocols typically do not require feedback (e.g., ACKs or NACKs), each of the service advertisements of 600 through 615 have relatively low reliability and for this reason are retransmitted at a relatively high frequency, which creates more traffic.

Figure 7:
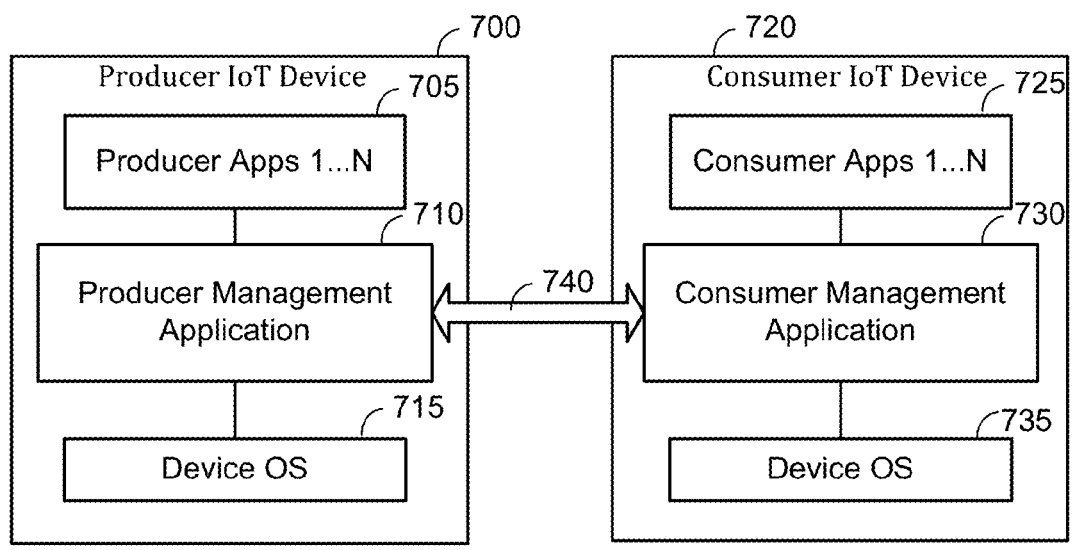
FIG. 7 illustrates software module architecture for a set of IoT devices in accordance with an embodiment of the invention.

FIG. 7 illustrates software module architecture for a set of IoT devices in accordance with an embodiment of the invention. Referring to FIG. 7, a producer IoT device 700 is provisioned with producer applications 1 . . . N, 705 (e.g., where N is greater than or equal to 1), a producer management application 710 and a device OS 715. A consumer IoT device 720 is provisioned with consumer applications 1 . . . N, 725 (e.g., where N is greater than or equal to 1), a consumer management application 730 and a device OS 735. Communication between the producer IoT device 700 and the consumer IoT device 720 is mediated via an IoT bus/transport 740, which can correspond to a Bluetooth connection, a WiFi connection, an LTE connection, etc. As will be described below, the respective management applications can implement a communication protocol such that a variety of application-layer services can be advertised without the need for each service to independently perform its own advertisement function. Further, it will be appreciated that the IoT bus/transport 740 not only connects producer IoT devices with consumer IoT devices, but can also be used for producer-to-producer communication as well as consumer-to-consumer communication within the IoT environment. Further, as used herein, "N" is not intended to be a constant value, such that N can be different in different context (e.g., the number of producer applications 1 . . . N does not need to be equal to the number of consumer applications 1 . . . N).

Figure 8:
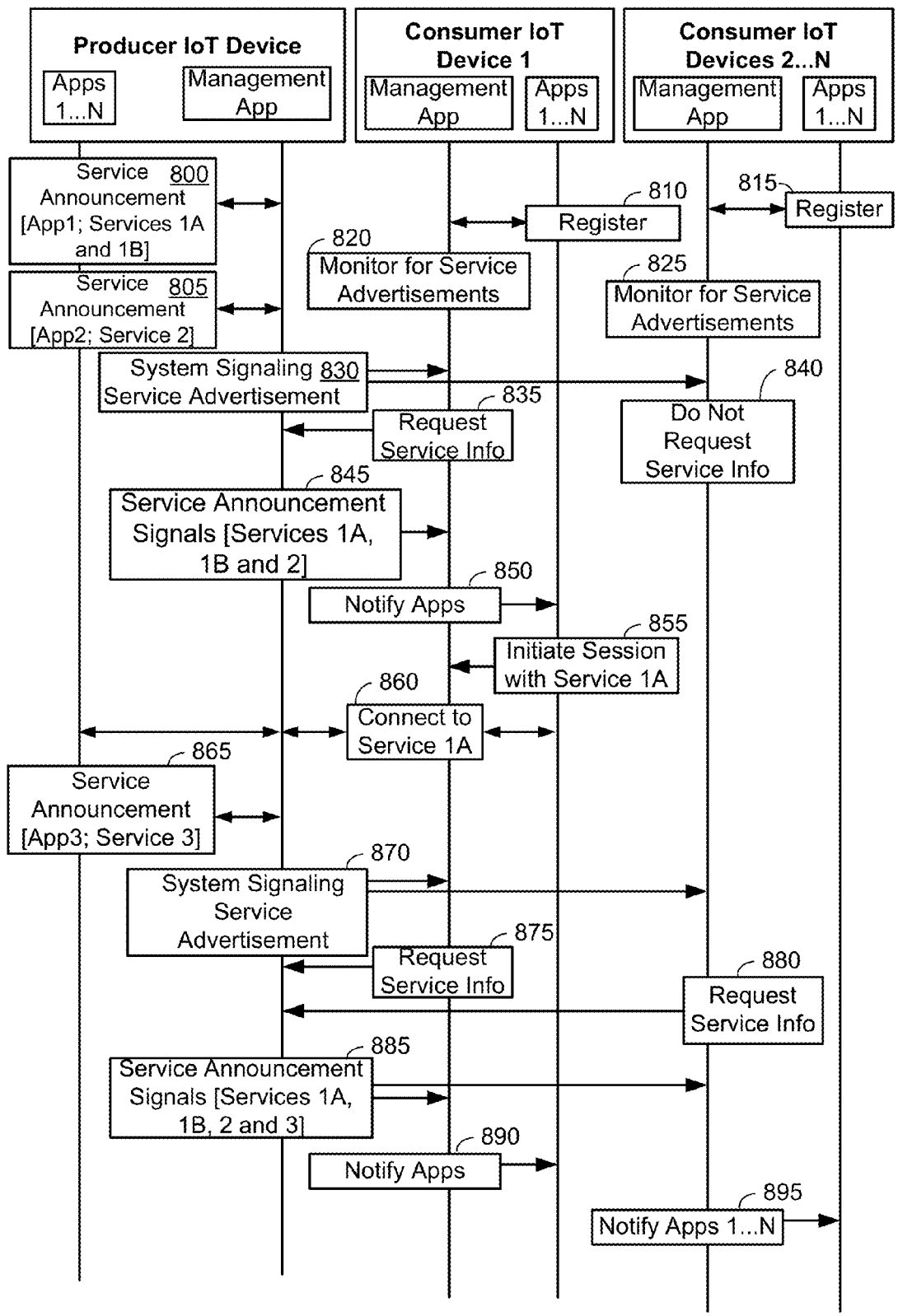
FIG. 8 illustrates a service advertisement procedure in accordance with an embodiment of the invention.

FIG. 8 illustrates a service advertisement procedure in accordance with an embodiment of the invention. Referring to FIG. 8, at the producer IoT device, App1 registers/announces services 1A and 1B with the producer management application via a service announcement signal, 800, and App2 registers/announces service 2 with the producer management application via a service announcement signal, 805. As used herein, service registration at the producer IoT device includes assigning a unique identifier to the application. Further, at the consumer IoT devices, one or more of Apps 1 . . . N perform a registration function with their respective consumer management applications, 810 and 815. The registration function of 810 triggers the consumer management application at consumer IoT device 1 to monitor the IoT bus/transport 740 for system signaling service advertisements, and the registration function of 815 similarly triggers the consumer management applications at consumer IoT devices 2 . . . N to monitor the IoT bus/transport 740 for system signaling service advertisements, 825.

The producer management application provides a system signaling service, which can be used by applications to advertise app layer services. More specifically, the system signaling service enables applications to send system signals advertising app layer services. In particular, the system signaling service sends out a multicast/broadcast advertisement indicating availability of new/updated app layer signals. Producer applications advertise their services by sending service announcements as system signals using system signaling service.

At 830, the producer management application transmits a system signaling service advertisement within the IoT environment that is configured to advertise that one or more app layer signals are currently available at the producer IoT device (i.e., service announcement signals for services, 1A, 1B and 2). The system signaling service advertisement includes connectivity information by which any of the consumer IoT devices 1 . . . N can connect back to the producer IoT device. In an example, the system signaling service advertisement message is kept relatively small to reduce the amount of multicast or broadcast overhead in the IoT environment by omitting any service-specific information. Instead, the system signaling service advertisement message includes a version number that changes each time the app layer signals information changes (e.g., when service announcement signals are added, updated, or removed at the producer IoT device, the version is modified), and any consumer IoT device that determines itself to be interested in obtaining the service-specific information can fetch this data from the producer IoT device for separate delivery via unicast. Thereby, consumer IoT devices can ignore system signaling service advertisement messages with redundant version numbers, while consumer IoT devices can request that the producer IoT device provide an app layer service announcement message (which includes the service-specific information) if the version number does not equal a current version number for system signaling service advertisement messages from the producer IoT device.

Further, the system signaling service advertisement 830 is an advertisement for one or more system signals. Each successive system signal of the given type functions to overwrite any previous system signal of the given type from the same app. As an example, a system signal for an IoT notification class from an app can correspond to an "urgent" or "emergency" system signal (e.g., high priority, such as "house is on fire!"), a "warning" system signal (e.g., intermediate priority, such as "humidity in house is currently above threshold" or "hot water heater is leaking") or an "information" system signal (e.g., low priority, such as "dishwasher is nearly done with its cycle"). In another example, an updated service announcement signal from an app overwrites the previous service announcement signal from the same app at the management application. Each consumer IoT device need only retain the version number of a previous system signaling service advertisement message to compare against the version number of later system advertisement messages.

Further, each system signal is associated with a time to live (TTL) whereby the sender (in this case, the producer IoT device) will continually retransmit the system signal until (i) the TTL expires, or (ii) a newer system signal of the same type becomes available. After expiration of a system signal, the system signal will no longer be transmitted even if requested. For example, a coffeemaker completing a pot of coffee may try to ping consumer IoT devices that the coffee is ready for 10 minutes (e.g., TTL=10 minutes), after which the coffeemaker will no longer try to broadcast this information and will not provide a "coffee complete" notification even if a consumer IoT device provides a delayed status inquiry to the coffeemaker. System signals will become more fully understood from a review of the embodiments described below.

Turning back to FIG. 8, consumer IoT devices 1 . . . N each receive the system signaling service advertisement. As shown, consumer IoT device 1 requests additional service information over unicast, 835 (e.g., based on a version number of the system signaling service advertisement from 830 being different than a current version number maintained at consumer IoT device 1), and consumer IoT devices 2 . . . N do not request additional service information (e.g., based on a version number of the system signaling service advertisement from 830 being the same as a current version number maintained at consumer IoT devices 2 . . . N). The consumer IoT device 1 uses the connectivity information received in the system signaling service advertisement to connect with the producer IoT device over unicast. The producer IoT device provides the service announcement signals for services 1A, 1B and 2 via unicast to consumer IoT device 1 in response to the request from 835, 845. In an example, the service announcement being transmitted via unicast to consumer IoT device 1 at 845 permits the service announcement to be larger (e.g., multicast messages in IoT environments typically have size constraints) and to be transmitted with less network overhead than multicast or broadcast messaging. In a further example, the service announcement is a unicast signal directed to a port number and IP address of consumer IoT device 1. As shown, consumer IoT device 1 delivers the service announcement to its registered Apps, 850. The service announcement includes details about the advertised services by the app including service port and app unique identifier. The service port and app unique identifier can be used to initiate a session with any of services 1A, 1B and 2 with the producer IoT device. Accordingly, one of the registered Apps requests that the consumer management application establish a session with service 1A, 855, after which the session is established with service 1A, 860.

Referring to FIG. 8, at the producer IoT device, App3 sends a service announcement signal for service 3 with the producer management application, 865. The new service announcement signal for service 3 prompts the producer management application to transmit an updated system signaling service advertisement within the IoT environment that is configured to advertise one or more app layer signals are currently available at the producer IoT device (i.e., service announcement signals for services, 1A, 1B, 2 and 3). Similar to 845, the system signaling service advertisement of 870 is sent over multicast/broadcast and does not actually include any service-specific information. Also, the system signaling service advertisement of 870 includes a different version number than the system signaling service advertisement of 830 to prompt consumer IoT devices to fetch a separate (and large) service announcement over unicast.

Turning back to FIG. 8, consumer IoT devices 1 . . . N each receive the system signaling service advertisement, and consumer IoT devices 1 . . . N each request additional service information over unicast based on connectivity information received in the system signaling service advertisement, 875 and 880 (e.g., based on a version number of the system signaling service advertisement from 870 being different than a current version number maintained at consumer IoT devices 1 . . . N). The producer IoT device provides the service announcement for services 1A, 1B 2, and 3 to consumer IoT devices 1 . . . N via separate unicast transmissions in response to the requests from 875 and 880, 885. In an example, unlike the system signaling service advertisement of 870, the service announcement is sent as separate unicast signals to consumer IoT devices 1 . . . N (e.g., so the service announcement can be larger in size as compared to the multicast system signaling service advertisement). Consumer IoT devices 1 . . . N each deliver the service announcement to their respective registered Apps, 890 and 895.

Figure 9:
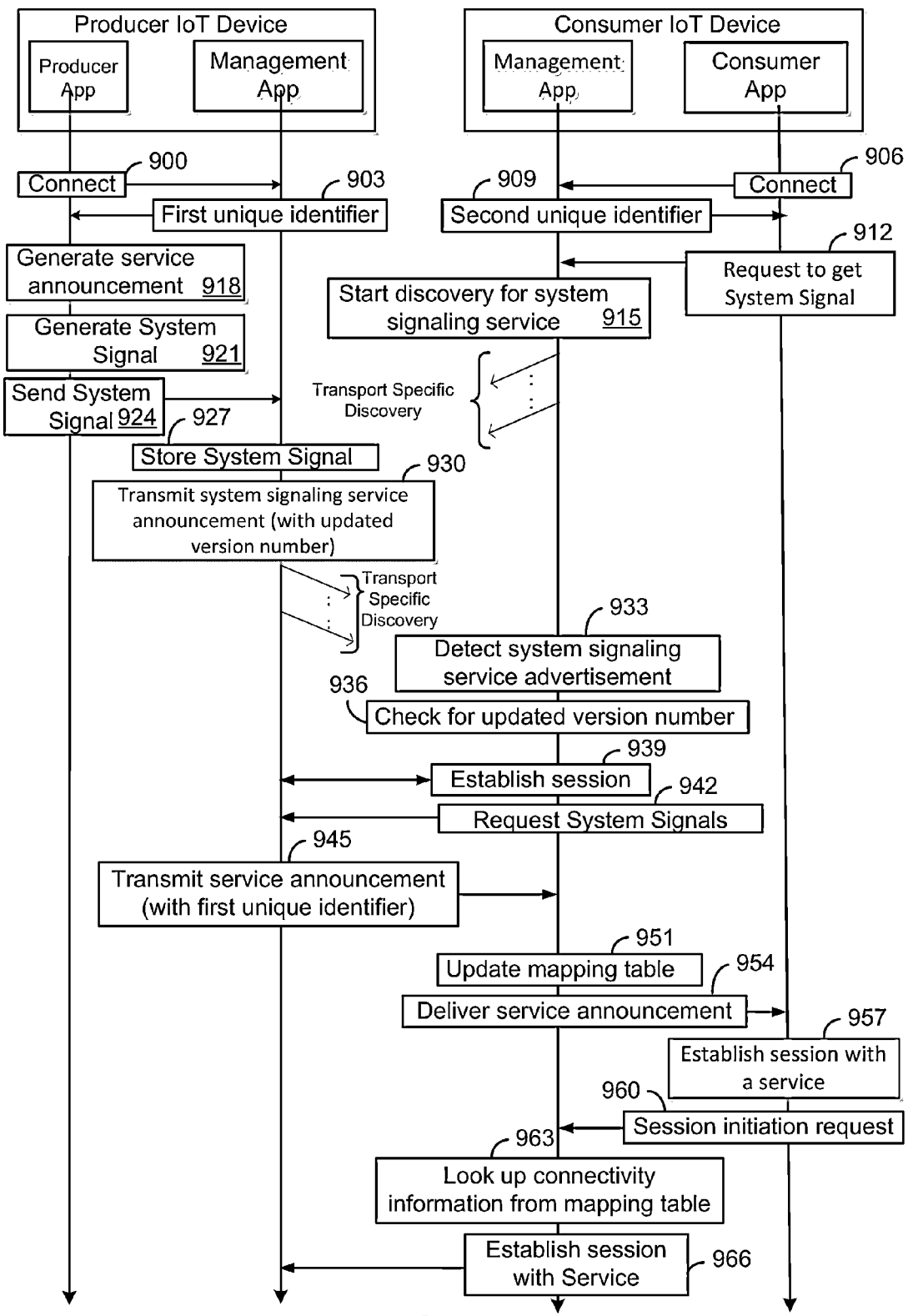
FIG. 9 illustrates a more detailed implementation example of a portion of the process of FIG. 8 in accordance with an embodiment of the invention.

FIG. 9 illustrates a more detailed implementation example of a portion of the process of FIG. 8 in accordance with an embodiment of the invention. Referring to FIG. 9, a given producer application registers with the producer management application by sending a Connect message, 900, and receiving an assignment of a first unique identifier, 903 (e.g., as described with reference to block 800 in FIG. 8). A consumer application at a consumer IoT device also registers with a transmission at 945 by sending a Connect message, 906, and receiving an assignment of a second unique identifier, 909 (e.g., similar to 810 or 815 of FIG. 8). The consumer application requests that the consumer management application monitor for system signals, 912, and the consumer management application begins a discovery procedure for the system signaling service by monitoring the IoT bus/transport 740 for a system signaling service advertisement, 915 (e.g., similar to 820 and 825 of FIG. 8).

The producer application generates a service announcement that includes information pertaining to the producer app's supported services, 918, and the producer application also generates a system signal from the announcement message, 921. The producer application provides the system signal for the service announcement to the producer management application, 924 (e.g., similar to 800 and 805 of FIG. 8), and the producer management application stores the service announcement system signal, 927. The producer management application increments a version number for the system signaling service advertisement and then begins to periodically transmit the system signaling service announcement with the updated version number throughout the IoT environment, 930 (e.g., similar to 830 of FIG. 8). The consumer IoT device detects the system signaling service advertisement, 933, and determines that the version number is updated, 936. The consumer IoT device receives a globally unique identifier (GUID) of the producer management application as part of the system signaling service advertisement of 933. The version number update detection at 936 prompts the consumer IoT device to establish a connection with the producer IoT device using connection information contained in the system signaling service advertisement, 939. Once connected, the consumer IoT device requests any available system signals, 942 (e.g., similar to 835, 875 or 880 of FIG. 8), and the producer IoT device transmits the stored system signal (i.e., the service announcement signals) via unicast to the consumer IoT device, 945 (e.g., similar to 845 or 885 of FIG. 8). The announcement signal includes the unique identifier assigned to the producer app (e.g. assigned at 903). In an example, unlike the system signaling service advertisement of 930, the service announcements sent at 945 are unicast signals directed to the management app of the consumer IoT device (e.g., so the service announcement can be larger in size as compared to the multicast system signaling service advertisement due to multicast size constraints that are typical in IoT environments).

Once the consumer management application obtains the system signals, the consumer management application updates a mapping table to include: a globally unique identifier (GUID) of the given producer management application; the most recent system signal version number received from the given producer management app; connectivity information (e.g., IP and port number) for connecting with the given producer management app; and unique identifiers assigned to producer apps advertising services via the given producer management app, 951. As shown, the consumer management application delivers the service announcement to the consumer application, 954. At some later point in time, the consumer application initiates a session with one of the advertised services by specifying a service port and unique identifier for the app, 957, and thereby delivers a session initiation request to the consumer management application, 960. The consumer management application looks up the connectivity information for the target service from its mapping table based on the unique identifier for the app, 963, and uses the connection information to establish a session with the specified service at the producer app via the producer management app, 966.

In a further embodiment, the procedure described with reference to FIG. 9 for system signaling may also be used for delivering notification messages generated by producer and/or consumer applications as system signals.

In yet a further embodiment, one or more producer IoT devices deployed in the IoT environment could be CPU, memory and/or battery limited. These limited producer IoT devices will most likely not be up and running all the time. Rather, these limited producer IoT devices may wake up periodically, perform certain functions and go back to sleep. Such devices are referred to herein as "thin client (TC)" producer IoT devices.

In an embodiment, a TC producer IoT device only has a lightweight TC application running on the device, and the TC producer IoT device accesses the IoT bus/transport 740 via another producer IoT device. So, a TC producer IoT device can essentially offload IoT bus functionality to another IoT device.

At start-up, the TC application discovers and connects to the IoT bus/transport 740 via another IoT device. From that point onwards, the TC application uses that connection to the IoT bus/transport 740 for accomplishing IoT functionality including service advertisement/discovery, session establishment with remote service, signal delivery, etc. If the TC application is not able to connect to a previously discovered IoT bus, it attempts to discover another IoT bus for setting up the connection. The TC application can use the same set of over-the-wire protocols as a standard non-TC (or standard) application. This ensures compatibility between thin client and standard IoT devices. Essentially, a remote application communicating with the TC application will not know that it is talking to a performance-constrained TC application.

In a further embodiment, a TC producer IoT device can generate an announcement message and send it to the connected IoT bus interface for transmission throughout the IoT environment via system signal. The TC producer IoT device can then go back to sleep. The announcement message will then be delivered over system signal by the IoT bus interface at the other IoT device while the TC producer IoT device is asleep. This announcement message will contain connection information for that IoT bus interface, and the IoT bus interface can in turn add additional information in the announcement message to indicate connectivity information back to the original producer app on the TC producer IoT device. Thus, the IoT bus interface on the other "standard" IoT device acts as a proxy IoT bus for the TC producer IoT device.

Figure 10:
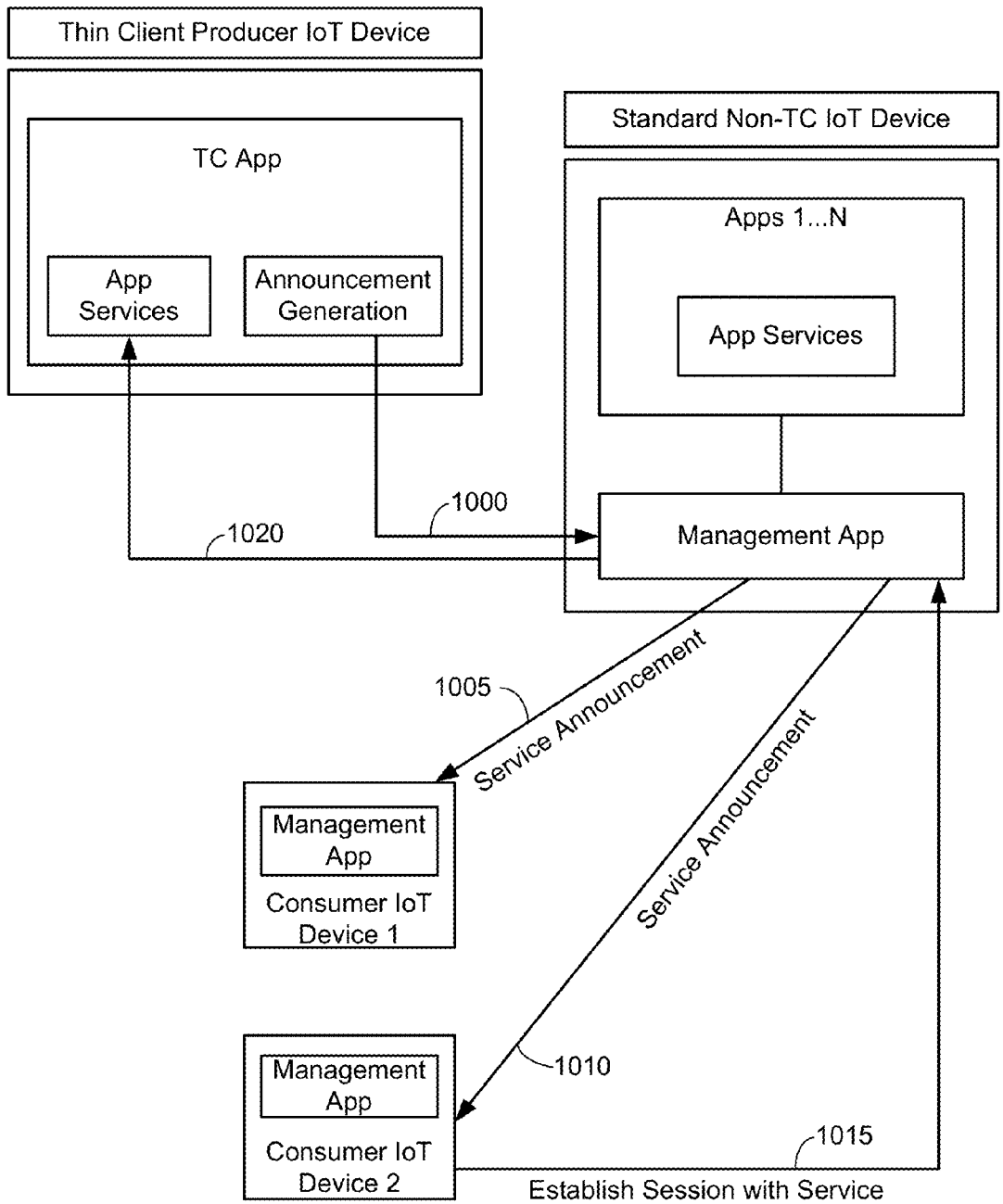
FIG. 10 illustrates an example of Thin Client (TC) IoT architecture in accordance with an embodiment of the invention.

FIG. 10 illustrates an example of TC IoT architecture in accordance with an embodiment of the invention. As described above, the TC producer IoT device can send service announcement signals to a connected management app on a standard or non-TC IoT device via connection 1000, and the standard IoT device can in turn have its management application advertise and deliver service announcements on behalf of the TC app (e.g., similar to steps 924 to 945), 1005 and 1010. Consumer IoT devices 1 and 2 receive the service announcement for services hosted by the TC app from the standard IoT device. Any requests to instantiate a service session with the TC app is done via the management app connected to the TC. In FIG. 10, consumer IoT device 2 attempts to establish a session with TC App service, and the session gets established via the management app at the standard non-TC IoT device, 1015 and 1020. Accordingly, it will be appreciated that all of the embodiments described in this Specification can be implemented whereby the producer IoT device is either a standard producer IoT device or a TC producer IoT device.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating Internet of Things (IoT) devices deployed in a local IoT environment, comprising:
   announcing, as a service announcement system signal to a producer management application at a producer IoT device, a set of services configured for execution on the producer IoT device, the producer management application providing a system signaling service through which one or more applications on the producer IoT device advertise application-layer services;
   wherein the service announcement system signal includes:
      a session port number for a service corresponding to the system signaling service advertisement; and
      a unique identifier assigned to the producer application generating the system signaling service advertisement;
   broadcasting, from the producer management application of the producer IoT device, a system signaling service advertisement to notify one or more consumer IoT devices in the local IoT environment that the service announcement system signal is available via the producer IoT device;
   receiving, at the producer IoT device, in response to the system signaling service advertisement, at least one request for fetching the service announcement system signal from at least one of the one or more consumer IoT devices; and
   unicasting, from the producer management application of the producer IoT device, in response to the at least one request, the service announcement system signal that announces the set of services to the at least one consumer IoT device;
   receiving, at the consumer IoT device, the at least one service announcement system signal that announces the set of services available at the producer IoT device;
   storing, at the consumer IoT device, connection information in a mapping table; and
   establishing, from the consumer IoT device, a session with an announced service in the service announcement system signal using the connection information.

2. The method of claim 1, including assigning a unique identifier for each app announcing services to the producer management application.

3. The method of claim 1, wherein the system signaling service advertisement includes:
   sending a version number with the system signaling service advertisement; and
   changing the version number each time service announcement system signals are added, updated or removed with the producer management application.

4. The method of claim 3, including:
   receiving the system signaling service advertisement at a consumer IoT device;
   determining, at the consumer IoT device, that the version number of the system signaling service advertisement is different than a version number of a previously received system signaling service advertisement;
   transmitting, from the consumer IoT device to the producer IoT device, in response to the version number being different, the at least one request for fetching the service announcement system signal from the producer IoT device.

5. The method of claim 4, wherein the connection information includes:
   a globally unique identifier (GUID) of the producer management application;
   a most recent system signal version number received from the producer management application;
   connectivity information for connecting with the producer management application; and
   unique identifiers assigned to producer apps advertising services via the producer management application.

6. The method of claim 5, wherein establishing a session includes:
   determining a unique identifier of a producer app announcing a service;
   determining the connectivity information associated with the unique identifier of the producer app from the mapping table; and
   using the connectivity information to establish a session with the producer app announcing the service.

7. The method of claim 1, wherein the system signaling service advertisement includes:
   a globally unique identifier (GUID) for the producer management application; and connectivity information including an IP address and service port for the one or more consumer IoT devices to connect back with the producer IoT device.

8. The method of claim 1, including:
assigning a time to live (TTL) value to the service announcement system signal; and
retransmitting the service announcement system signal until the TTL value is reached, the service announcement system signal is removed, or an updated service announcement system signal is made available.

9. An Internet of Things (IoT) system, comprising:
a producer IoT device comprising:
a transceiver to communicate with other IoT devices over a network;
a peer-to-peer platform configured to provide a peer-to-peer connection between the IoT device and the other IoT devices in a local IoT environment;
a management application that is configured to:
receive a service announcement system signal that announces a set of services configured for execution on the IoT device;
broadcast, from the IoT device, a system signaling service advertisement to notify one or more consumer IoT devices in the local IoT environment that the service announcement system signal is available;
send a version number with the system signaling service advertisement, and change the version number each time service announcement system signals are added, updated, or removed;
receive, at the IoT device from at least one of the consumer IoT devices, in response to the system signaling service advertisement, at least one request for fetching the service announcement system signal;
unicast, from the producer IoT device, in response to the at least one request, the service announcement system signal that announces the set of services to the at least one consumer IoT device; and
a consumer IoT device including a consumer-side management application configured to:
receive the system signaling service advertisement from the producer IoT device;
determine the version number of the system signaling service advertisement is different than a version number of a previously received system signaling service advertisement;
transmit, to the producer IoT device, in response to the version number being different, the at least one request for fetching the service announcement system signal; and
receive the at least one service announcement system signal that announces the set of services available at the producer IoT device.

10. The IoT system of claim 9, wherein the at least one service announcement system signal includes a session port number and IP address to enable the at least one consumer IoT device to initiate a session with the set of services.

11. The IoT system of claim 9, wherein the management application is configured to:
assign a time to live (TTL) value to the service announcement system signal; and
retransmit the service announcement system signal until the TTL value is reached, the service announcement system signal is removed, or an updated service announcement system signal is made available.

12. A non-transitory, tangible computer readable storage medium, encoded with processor readable instructions to perform a method for operating a consumer Internet of Things (IoT) device deployed in a local IoT environment, the method comprising:
announcing, as a service announcement system signal to a producer management application, at a producer IoT device, a set of services configured for execution on the producer IoT device, the producer management application providing a system signaling service through which one or more applications on the producer IoT device advertise application-layer services;
wherein the service announcement system signal includes:
a session port number for a service corresponding to the system signaling service advertisement; and
a unique identifier assigned to the producer application generating the system signaling service advertisement;
broadcasting, from the producer management application of the producer IoT device, a system signaling service advertisement to notify one or more consumer IoT devices in the local IoT environment that the service announcement system signal is available via the producer IoT device;
receiving, at the producer IoT device, in response to the system signaling service advertisement, at least one request for fetching the service announcement system signal from at least one of the one or more consumer IoT devices;
unicasting, from the producer management application of the producer IoT device, in response to the at least one request, the service announcement system signal that announces the set of services to the at least one consumer IoT device
receiving, at the consumer IoT device, the at least one service announcement system signal that announces the set of services available at the producer IoT device;
storing, at the consumer IoT device, connection information in a mapping table; and
establishing, from the consumer IoT device, a session with an announced service in the service announcement system signal using the connection information.

13. The non-transitory, tangible computer readable storage medium of claim 12, wherein the method includes:
sending a version number with the system signaling service advertisement; and
changing the version number each time service announcement system signals are added, updated or removed with the producer management application.

14. The non-transitory, tangible computer readable storage medium of claim 13, wherein the method includes:
receiving, the system signaling service advertisement at a consumer IoT device;
determining, at the consumer IoT device, that the version number of the system signaling service advertisement is different than a version number of a previously received system signaling service advertisement;
transmitting, from the consumer IoT device to the producer IoT device, in response to the version number being different, the at least one request for fetching the service announcement system signal from the producer IoT device.

15. The non-transitory, tangible computer readable storage medium of claim 12, wherein the service announcement system signal includes a port number and IP address to enable the at least one consumer IoT device to initiate a session with the set of services.

16. The non-transitory, tangible computer readable storage medium of claim 12, wherein the method includes:
- assigning a time to live (TTL) value to service announcement system signal; and
- retransmitting the service announcement system signal until the TTL value is reached, the service announcement system signal is removed, or an updated service announcement system signal is made available.

\* \* \* \* \*